March 17, 1953     H. C. RHODES     2,631,549
DOUGH POWER CURLER
Filed Oct. 20, 1948     2 SHEETS—SHEET 1
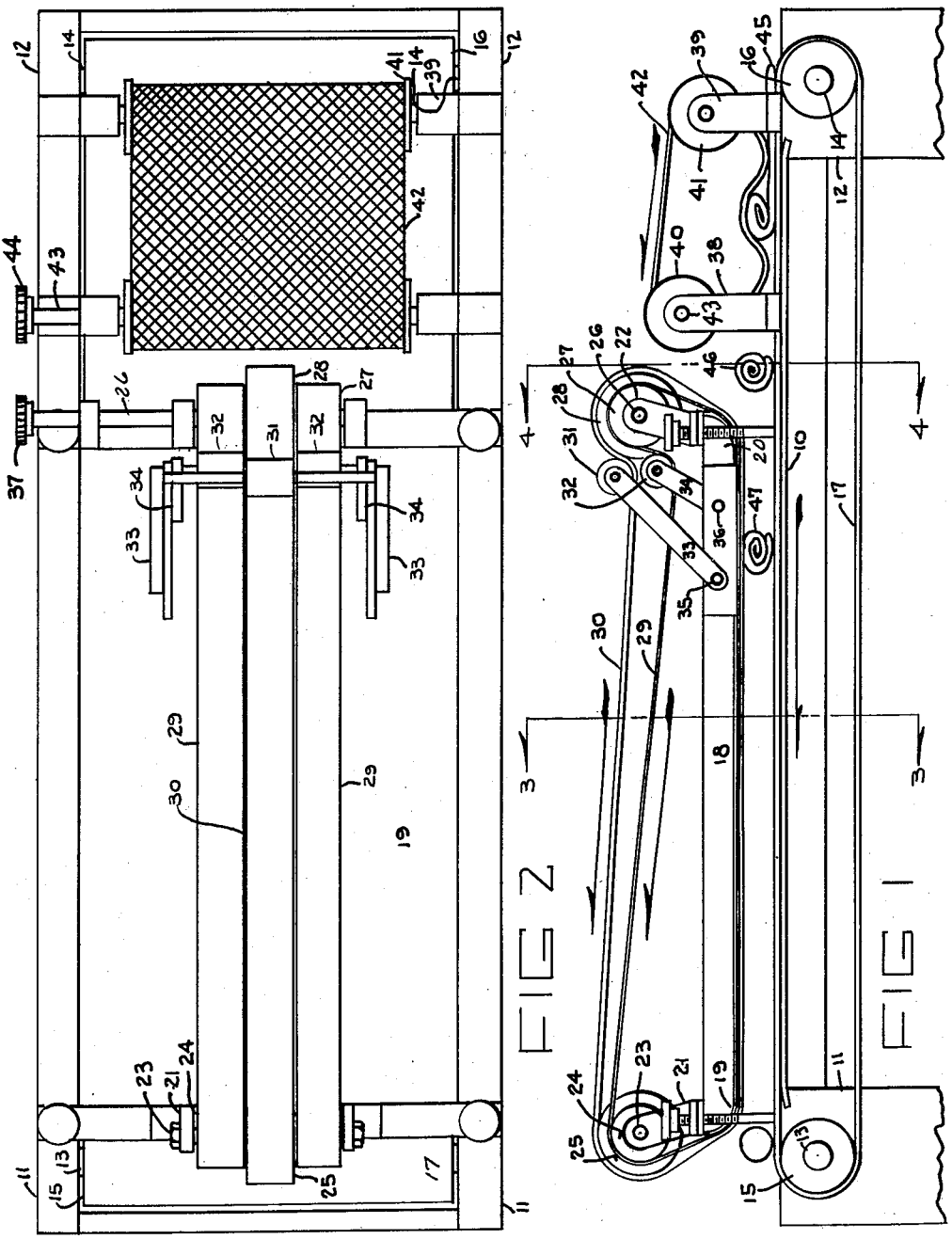
INVENTOR
H. C. RHODES
BY Eichenberrel
ATTORNEY.

March 17, 1953  H. C. RHODES  2,631,549
DOUGH POWER CURLER
Filed Oct. 20, 1948  2 SHEETS—SHEET 2

INVENTOR
H. C. RHODES
BY E. W. Bickenbeul
ATTORNEY

Patented Mar. 17, 1953

2,631,549

UNITED STATES PATENT OFFICE 2,631,549

DOUGH POWER CURLER

Herbert Cecil Rhodes, Portland, Oreg., assignor to Read Standard Corporation, a corporation of Delaware Application October 20, 1948, Serial No. 55,475

2 Claims. (Cl. 107—9)

This invention relates generally to the bread making industry and particularly to a dough twister and power curler.

The main object of this invention is to provide a machine for twisting the dough before being placed in the pan for baking for the purpose of changing the grain and closing holes in the dough and retarding the drying action of the bread by the elongation and distortion of the holes.

The second object is to provide a dough kneading machine whereby a more completely uniform texture is insured throughout the entire mass of the dough pieces.

I accomplish these and other objects in the manner set forth in the following specification as illustrated in the accompanying drawings, in which:

Fig. 1 is a side elevation of the machine.

Fig. 2 is a plan view of the machine.

Like numbers of reference refer to the same or similar parts throughout the several views.

Figure 3:
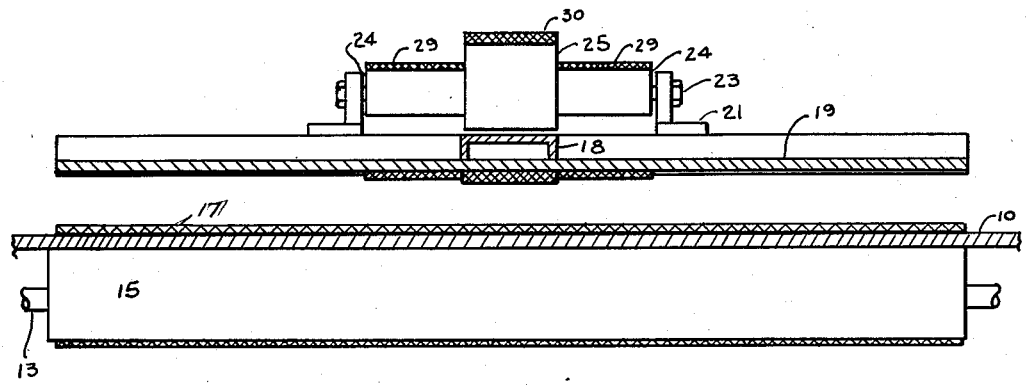
Fig. 3 is a vertical section taken along the line 3—3 in Fig. 1.
Figure 4:
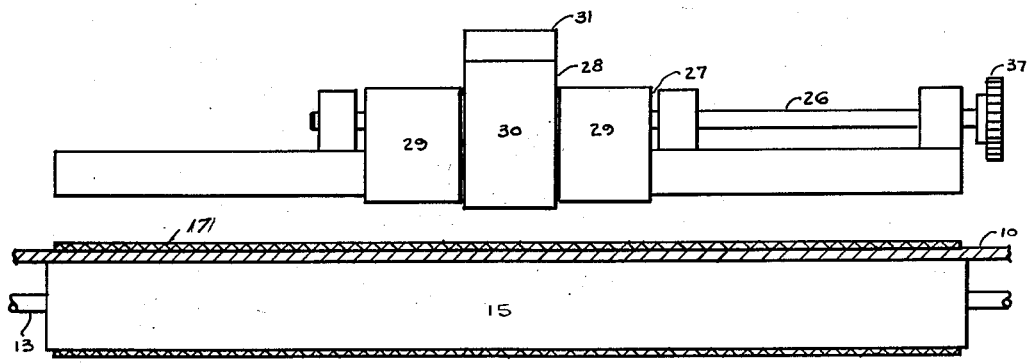
Fig. 4 is a vertical section taken along the line 4—4 in Fig. 1.

Referring in detail to the drawing, there is shown a table 10 mounted on the legs 11 and 12. Mounted across the ends of the table 10 are the shafts 13 and 14 on which are mounted the pulleys 15 and 16 around which pass the apron 17 the top run of which rides upon the table 10.

The apron 17 may be driven by any suitable means (not shown) power being supplied through either of the shafts 13 or 14.

Above the table 10 is mounted the horizontal frame 18, above whose rounded ends 19 and 20 are secured the standards 21 and 22. On the standard 21 is mounted a bolt 23, upon which are mounted the rotatable pulleys 24 and 25 which are of different diameter.

On the standard 22 is mounted a transverse shaft 26 on which are mounted the rotatable drive pulleys 27 and 28. The pulleys 27 equal in diameter the pulleys 24 and the pulley 28 equals in diameter the pulley 25.

The belts 29 pass around the pulleys 24 and 27 and a belt 30 passes around the pulleys 28 and 25.

Belt tightening pulleys 31 and 32 are mounted on the arms 33 and 34 which are hingedly attached to the frame 18 by means of the pins 35 and 36. Power is supplied to the shaft 26 from any convenient source of power through the sprocket wheel 37 which is secured on the end of the shaft 26.

Mounted on the table 10 are the standards 38 and 39 which support the rolls 40 and 41, around which is loosely passed the wire cloth belt 42, to which motion is imparted by the roll 40 through its shaft 43 on which is secured a sprocket wheel 44 to which power may be supplied from any convenient source (not shown).

The operation of the device is as follows: Assuming that a piece of dough 45 is fed onto the table 10 by means of the apron 17 beneath the lower run of the belt 42 which is travelling in the opposite direction, it can be seen that the dough will be curled up to form an elongated roll which is carried forward by the apron 17 underneath the belts 29 and 30.

It will be noted that the central belt 30 is somewhat thicker than the outer belts 29 and therefore projects somewhat below the outer belts as shown in Fig. 3; that is, placing it in a somewhat more closer contact with the roll 46.

It will also be observed that the pulleys 27 and 28 are on the same shaft 26 and will be driven at the same speed but, having different diameters, the pulley 28 will drive the belt 30 faster than the pulleys 27 will drive the belts 29. The result is the impartation of a twisting motion to the roll 47 throughout the length of its travel toward the discharge end of the machine.

It can be seen from the foregoing that without the use of additional equipment, or the expenditure of time, desirable twisting action is imparted and the texture of the bread is greatly improved.

I claim:

1. In a device for coiling a sheet of dough, an endless carrier belt for conveying sheets of dough on the top run thereof, an endless chain web curling belt including top and bottom runs mounted above in spaced relation to and in alinement with said carrier belt, said curling belt having sufficient slack in its bottom run for engagement with said carrier belt when the upper run is taut, means for driving said carrier and curling belts with the upper run of the carrier belt and the lower run of the curling belt traveling in opposite directions, and said curling belt being driven from that end remote from the entrant end of the dough sheets to the curling belt to maintain the slack in the lower run of said curling belt, whereby the dough sheets contact the slack portion of said curling belt to coil said moving sheets of dough.

2. In a device for coiling a sheet of dough, a horizontal longitudinally movable carrier for sheets of dough, a pair of rotatable rolls mounted transversely above and in spaced relation to said carrier and disposed parallel with respect to each other and spaced apart longitudinally of each other, an endless chain web curling belt trained over said rolls and having sufficient slack in its bottom run for engagement with said carrier when the upper run is taut, means for driving the roll remote from the entrant end of the dough sheets to the curling belt for operating the lower run of said curling belt in a direction opposed to the direction of travel of said carrier, whereby the dough sheets contact the slack portion of said curling belt to coil said moving sheets of dough.

HERBERT C. RHODES.

REFERENCES CITED

The following references are of record in the file of this patent:

UNITED STATES PATENTS

| Number | Name | Date |
|---|---|---|
| 638,090 | Bryce et al. | Nov. 28, 1899 |
| 795,581 | Corby et al. | July 25, 1905 |
| 883,370 | Wood | Mar. 31, 1908 |
| 941,338 | Petri | Nov. 23, 1909 |
| 999,089 | Bird | July 25, 1911 |
| 1,156,185 | Schreiber | Oct. 12, 1915 |
| 1,757,306 | Harber et al. | May 6, 1930 |
| 2,173,632 | Peters | Sept. 19, 1939 |
| 2,479,864 | Rhodes | Aug. 23, 1949 |

FOREIGN PATENTS

| Number | Country | Date |
|---|---|---|
| 183,848 | Great Britain | July 26, 1923 |